(12) United States Patent
Yagasaki

(10) Patent No.: US 11,143,269 B2
(45) Date of Patent: Oct. 12, 2021

(54) METAL BELT FOR CONTINUOUSLY VARIABLE TRANSMISSION AND METHOD OF MANUFACTURING METAL RING OF METAL BELT FOR CONTINUOUSLY VARIABLE TRANSMISSION

(71) Applicant: Honda Motor Co., Ltd., Tokyo (JP)

(72) Inventor: Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 16/147,904

(22) Filed: Oct. 1, 2018

(65) Prior Publication Data

US 2019/0101184 A1    Apr. 4, 2019

(30) Foreign Application Priority Data

Oct. 3, 2017  (JP) .............................. JP2017-193188
Jan. 24, 2018  (JP) .............................. JP2018-009641

(51) Int. Cl.
*F16G 5/16*    (2006.01)
*B32B 5/02*    (2006.01)
(Continued)

(52) U.S. Cl.
CPC ................ *F16G 5/16* (2013.01); *B32B 5/028* (2013.01); *F16G 5/163* (2013.01); *F16G 5/18* (2013.01);
(Continued)

(58) Field of Classification Search
CPC ... F16G 5/16; F16G 5/163; F16G 5/00; F16G 5/10; F16G 5/18; F16G 5/20; F16G 1/00;
(Continued)

(56) References Cited

U.S. PATENT DOCUMENTS 4,332,575 A  *  6/1982  Hendriks .................. F16G 5/16
                                                        474/201
6,090,004 A  *  7/2000  Kanehara ................ F16G 5/163
                                                        474/201
(Continued)

FOREIGN PATENT DOCUMENTS

CN    1249364    4/2006
JP    H02514     1/1990
(Continued)

OTHER PUBLICATIONS

JP2013-024292A Translation; Murakami et al; Transmission Belt; Published: Feb. 4, 2013; Publisher: EPO/ Espacenet (Year: 2013).*
(Continued)

*Primary Examiner* — Michael R Mansen
*Assistant Examiner* — Raveen J Dias
(74) *Attorney, Agent, or Firm* — JCIPRNET

(57) ABSTRACT

Among a plurality of layers of metal rings, an inner circumferential projection is formed on an inner circumferential surface of at least one metal ring, and an outer circumferential projection is formed on an outer circumferential surface of the outermost metal ring. Thus, cracks extending from a surface of the metal ring can be arrested by the inner circumferential projection and the outer circumferential projection. Moreover, the outer circumferential projection of the outermost metal ring that does not abut against any other members is set to have a smaller projection height than the inner circumferential projection that abuts against other members. Thus, even if the inner circumferential projection wears by abutting against the other members, the inner circumferential projection can remain and arrest extension of the cracks; also, the projection height of the outer circumferential projection is reduced to enhance flatness of the outer circumferential surface of the metal ring.

1 Claim, 8 Drawing Sheets

(51) Int. Cl.
    *F16G 5/18*     (2006.01)
    *B32B 1/00*     (2006.01)
    *B32B 15/01*     (2006.01)

(52) U.S. Cl.
    CPC ............ *B32B 1/00* (2013.01); *B32B 15/01* (2013.01); *B32B 2413/00* (2013.01)

(58) Field of Classification Search
    CPC ..... F16G 1/22; F16G 1/24; F16G 1/28; F16H 9/04; F16H 9/24
    See application file for complete search history.

(56) References Cited

U.S. PATENT DOCUMENTS

| | | | | |
|---|---|---|---|---|
| 2001/0009875 A1* | 7/2001 | Vermeulen | ............ | F16G 5/163 474/84 |
| 2002/0123405 A1* | 9/2002 | Brandsma | ........... | F16H 57/0489 474/237 |
| 2002/0137586 A1* | 9/2002 | Fujioka | ................. | F16G 5/163 474/245 |
| 2004/0067808 A1* | 4/2004 | Kanehara | ................ | F16G 5/16 474/242 |
| 2006/0144112 A1* | 7/2006 | Nakajima | ................ | B21B 5/00 72/111 |
| 2016/0153524 A1* | 6/2016 | Ando | ....................... | F16G 5/16 474/242 |

FOREIGN PATENT DOCUMENTS

| | | | | |
|---|---|---|---|---|
| JP | 2004011887 | | 1/2004 | |
| JP | 2004261818 | | 9/2004 | |
| JP | 2008045573 | | 2/2008 | |
| JP | 4078126 | | 4/2008 | |
| JP | 2013024292 | | 2/2013 | |
| JP | 5968332 | | 8/2016 | |
| WO | WO-2012081974 A1 * | | 6/2012 | ............ F16G 5/16 |

OTHER PUBLICATIONS

"Office Action of Japan Counterpart Application", dated Aug. 21, 2019, with English translation thereof, p. 1-p. 6.

"Office Action of China Counterpart Application", dated Mar. 13, 2020, with English translation thereof, pp. 1-10.

\* cited by examiner

Inner and outer circumferential surfaces of metal ring

Inner circumferential surface of metal ring

METAL BELT FOR CONTINUOUSLY VARIABLE TRANSMISSION AND METHOD OF MANUFACTURING METAL RING OF METAL BELT FOR CONTINUOUSLY VARIABLE TRANSMISSION

CROSS-REFERENCE TO RELATED APPLICATION

This application claims the priority benefit of Japan Application No. 2018-009641, filed on Jan. 24, 2018, which claims the priority benefit of Japan Application No. 2017-193188, filed on Oct. 3, 2017. The entirety of each of the above-mentioned patent applications is hereby incorporated by reference herein and made a part of this specification.

BACKGROUND

Technical Field

The disclosure relates to a metal belt for a continuously variable transmission, wherein the metal belt is wound around a drive pulley and a driven pulley, and includes an endless metal ring assembly and a plurality of metal elements supported by the metal ring assembly, the metal ring assembly being formed by laminating a plurality of layers of endless metal rings. The disclosure also relates to a method of manufacturing a metal ring of the above metal belt for a continuously variable transmission.

Related Art

It is known by Japanese Patent No. 4078126 that, in a metal ring of a metal belt of a belt type continuously variable transmission, a projection projecting in a mesh-like manner is formed on an inner circumferential surface of the metal ring, and an average width of the projection in a direction orthogonal to a traveling direction of the metal belt is set to 16 μm or less. By doing so, cracks occurring in a top portion of the projection due to contact with a metal element are prevented from extending and durability of the metal ring is enhanced.

In addition, it is known by Japanese Utility Model No. Hei 2-514 that, by adding cross-shaped streaks on both an inner circumferential surface and an outer circumferential surface of a metal ring of a metal belt of a belt type continuously variable transmission by cross-hatching, a coefficient of friction is adjusted.

In the disclosure of Japanese Patent No. 4078126, since no projection is formed on the outer circumferential surface of the metal ring, there is a possibility that cracks may extend from the outer circumferential surface of the outermost metal ring to cause breakage.

In addition, in the disclosure of Japanese Utility Model No. Hei 2-514, since a projection (streaks) is formed on both the inner circumferential surface and the outer circumferential surface of the metal ring, there is a possibility that durability of the outermost metal ring may be enhanced by the projection of the outer circumferential surface. However, in the case where the projection is provided on a surface of the metal ring, as a projection height of the projection increases, the effect of arresting extension of the cracks is increased; on the other hand, there are problems that flatness of the surface may be reduced to reduce lubricity and machining load during machining of the projection may be increased.

The disclosure, while reducing the projection height of the projection of the metal ring of the belt type continuously variable transmission to a necessary minimum, enhances durability of the metal ring against breakage.

SUMMARY

According to a first aspect of the disclosure, a metal belt for a continuously variable transmission is proposed, wherein the metal belt is wound around a drive pulley and a driven pulley, and includes an endless metal ring assembly and a plurality of metal elements supported by the metal ring assembly, the metal ring assembly being formed by laminating a plurality of layers of endless metal rings. In the metal belt for a continuously variable transmission, a mesh-like inner circumferential projection is formed on an inner circumferential surface of at least one metal ring among the plurality of layers of metal rings, a mesh-like outer circumferential projection is formed on an outer circumferential surface of the outermost metal ring among the plurality of layers of metal rings, and a projection height of the outer circumferential projection is set smaller than a projection height of the inner circumferential projection.

According to a second aspect of the disclosure, in addition to the configuration of the first aspect of the disclosure, a metal belt for a continuously variable transmission is proposed in which the projection height of the outer circumferential projection is greater than a thickness of a surface defect layer of the metal ring.

According to a third aspect of the disclosure, a method of manufacturing a metal ring of a metal belt for a continuously variable transmission is proposed, wherein the method is a method of manufacturing a metal ring of the metal belt for a continuously variable transmission according to the first aspect or second aspect of the disclosure. The method includes the following steps. In a first step, the unmachined metal ring is rolled using an inner roller having a mesh-like circumferential surface and an outer roller having a flat circumferential surface, and a provisional projection is formed on an inner circumferential surface of the metal ring. In a second step, a front and back of the metal ring having the provisional projection formed on the inner circumferential surface is reversed. In a third step, the metal ring with its front and back reversed is rolled using the inner roller and the outer roller to form the inner circumferential projection on the inner circumferential surface of the metal ring, and a projection height of the provisional projection of the outer circumferential surface of the metal ring is reduced to form the outer circumferential projection.

According to the configuration of the first aspect of the disclosure, the mesh-like inner circumferential projection is formed on the inner circumferential surface of at least one metal ring among the plurality of layers of metal rings, and the mesh-like outer circumferential projection is formed on the outer circumferential surface of the outermost metal ring among the plurality of layers of metal rings. Thus, by arresting cracks extending from the inner circumferential surface of the metal ring by the inner circumferential projection, and by arresting cracks extending from the outer circumferential surface of the outermost metal ring by the outer circumferential projection, breakage of the metal ring can be prevented.

Moreover, the outer circumferential projection of the outermost metal ring that does not abut against any other members is set to have a smaller projection height than the inner circumferential projection that abuts against other members. Thus, even if the inner circumferential projection having the greater projection height wears by abutting against the other members, the inner circumferential projection can remain and arrest extension of the cracks; also, the projection height of the outer circumferential projection in which no wear occurs is reduced to enhance flatness of the outer circumferential surface of the metal ring, and lubricity of the metal ring can be ensured and workability thereof can be improved.

According to the configuration of the second aspect of the disclosure, the projection height of the outer circumferential projection is greater than the thickness of the surface defect layer. Thus, even if small cracks existing in a deepest part of the surface defect layer are about to extend, the extension of the cracks is arrested by a stepped portion of a side surface of the inner circumferential projection, and breakage of the metal ring can be prevented.

According to the configuration of the third aspect of the disclosure, the first step of rolling the unmachined metal ring using the inner roller having a mesh-like circumferential surface and the outer roller having a flat circumferential surface and forming the provisional projection on the inner circumferential surface of the metal ring, the second step of reversing the front and back of the metal ring having the provisional projection formed on the inner circumferential surface, and the third step of rolling the metal ring with its front and back reversed using the inner roller and the outer roller to form the inner circumferential projection on the inner circumferential surface of the metal ring, and reducing the projection height of the provisional projection of the outer circumferential surface of the metal ring to form the outer circumferential projection are included. Thus, even if one having a mesh-like circumferential surface is used only as the inner roller, and one having a flat circumferential surface is used as the outer roller, both the inner circumferential projection and the outer circumferential projection can be formed on the metal ring.

DESCRIPTION OF THE EMBODIMENTS

First Embodiment

A first embodiment of the disclosure is explained below based on FIG. 1 to FIG. 7B.

Figure 1:
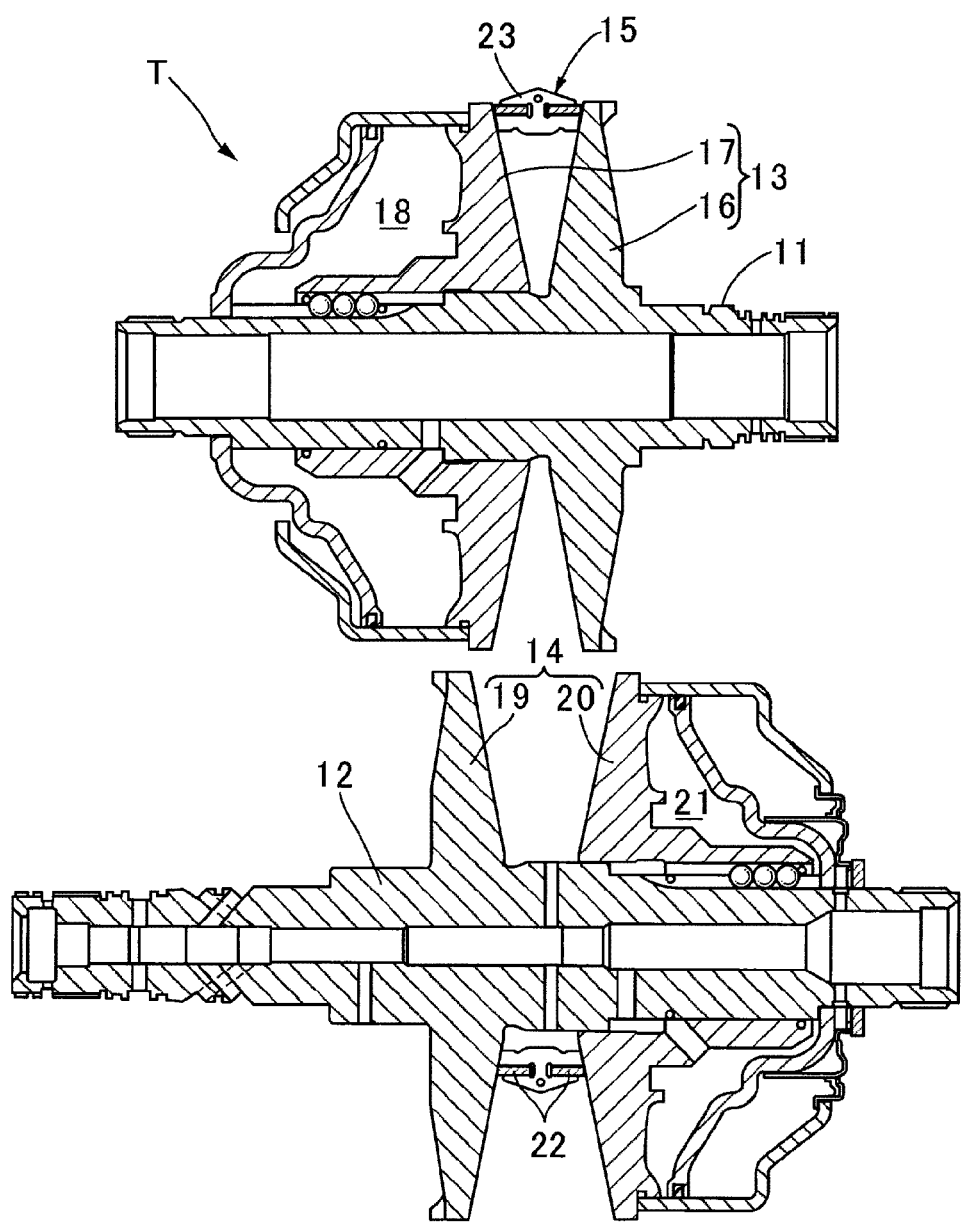
FIG. 1 illustrates an overall configuration of a belt type continuously variable transmission. (First Embodiment)

FIG. 1 illustrates a schematic structure of a belt type continuously variable transmission T mounted on an automobile, wherein the belt type continuously variable transmission T includes a drive shaft 11 connected to an engine, and a driven shaft 12 connected to a driving wheel, and an endless metal belt 15 is wound around a drive pulley 13 provided on the drive shaft 11 and a driven pulley 14 provided on the driven shaft 12. The drive pulley 13 includes a fixed pulley half 16 fixedly installed on the drive shaft 11, and a movable pulley half 17 capable of coming into contact with and separating from the fixed pulley half 16, wherein the movable pulley half 17 is energized toward the fixed pulley half 16 by an oil pressure acting on an oil chamber 18. The driven pulley 14 includes a fixed pulley half 19 fixedly installed on the driven shaft 12, and a movable pulley half 20 capable of coming into contact with and separating from the fixed pulley half 19, wherein the movable pulley half 20 is energized toward the fixed pulley half 19 by an oil pressure acting on an oil chamber 21.

Figure 2:
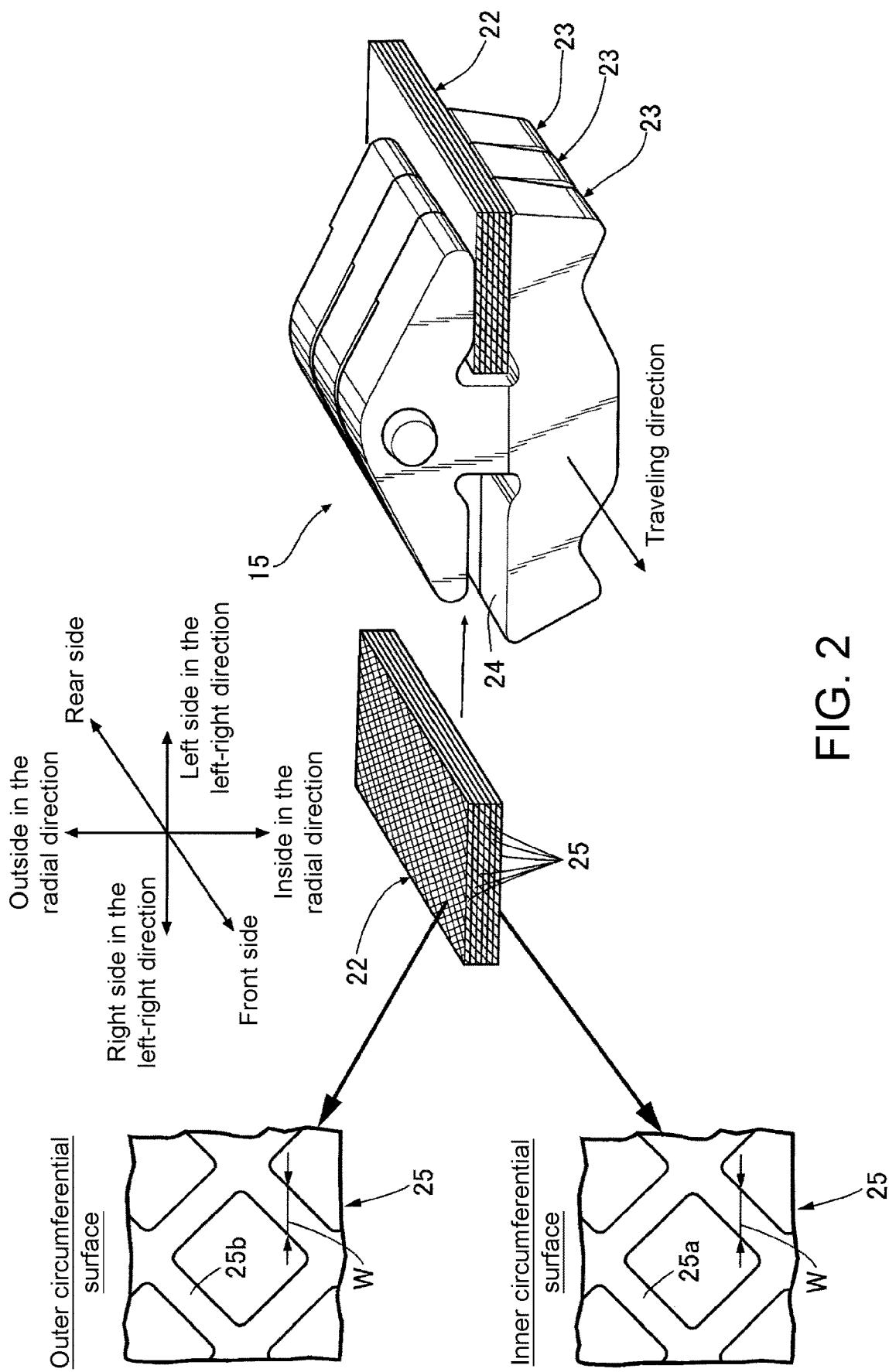
FIG. 2 is a perspective view of a metal belt and metal elements. (First Embodiment)

As shown in FIG. 2, the metal belt 15 is formed by supporting a large number of metal elements 23 on a pair of left and right metal ring assemblies 22. A pair of left and right saddle surfaces 24 are formed on each metal element 23, and inner circumferential surfaces of the metal ring assemblies 22 are respectively supported on the saddle surfaces 24. The metal ring assembly 22 is formed by laminating a plurality of (e.g., twelve) endless metal rings 25. In the present embodiment, a mesh-like inner circumferential projection 25a projects from an inner circumferential surface of all the metal rings 25, and a mesh-like outer circumferential projection 25b projects from an outer circumferential surface of only the outermost metal ring 25. The inner circumferential projection 25a and the outer circumferential projection 25b include a large number of linear projections inclined to the left and right at 45° each with respect to a traveling direction of the metal belt 15 and orthogonal to each other, and an average width W of each linear projection in the direction orthogonal to the traveling direction of the metal belt 15 may be equal to or less than 16 µm.

Figure 3:
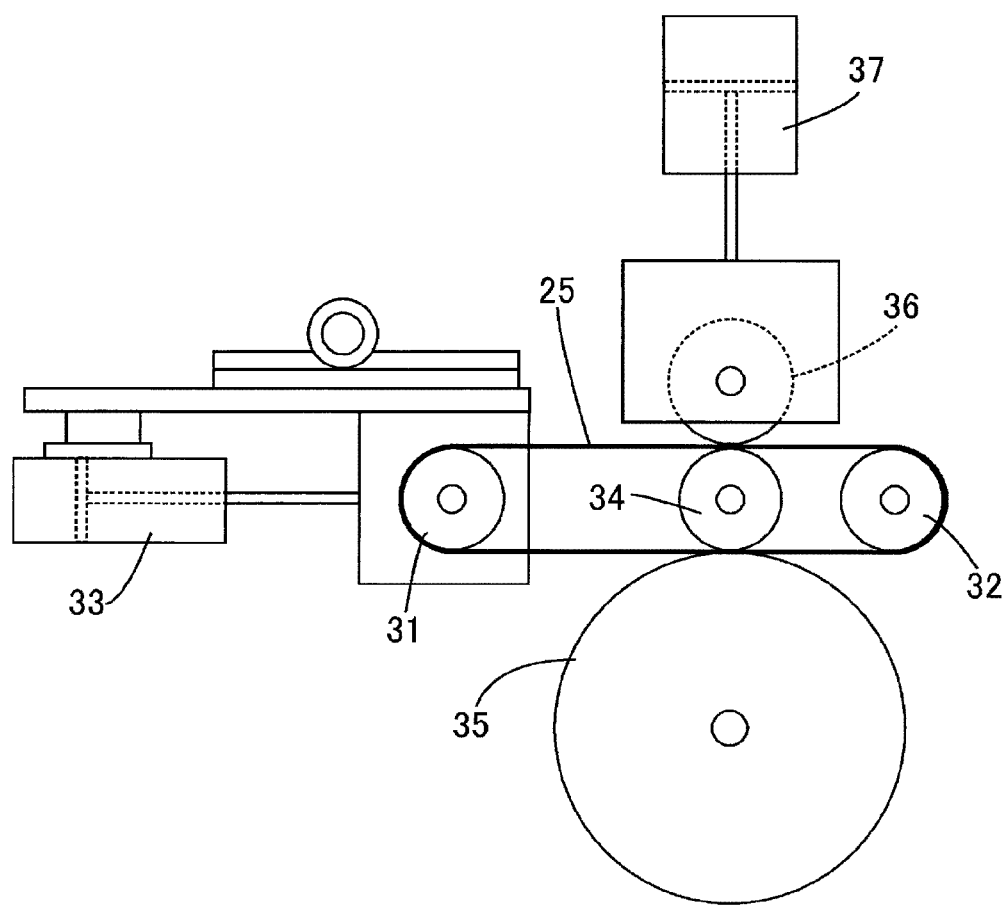
FIG. 3 illustrates a machining apparatus for forming a projection on a metal ring. (First Embodiment)

FIG. 3 shows a rolling apparatus for machining the inner circumferential projection 25a and the outer circumferential projection 25b on the metal ring 25. The metal ring 25 as a workpiece is wound around a pair of pulleys 31 and 32, wherein by energizing the pulley 31 on one side in a direction away from the pulley 32 on the other side by a cylinder 33, a predetermined tension is given to the metal ring 25. In this state, when the pulley 31 on one side is rotationally driven, the metal ring 25 circulates. The metal ring 25 is sandwiched between an inner roller 34 and an outer roller 35 disposed so as to face each other, and the metal ring 25 is sandwiched between the inner roller 34 and a pressure roller 36 disposed so as to face each other. The pressure roller 36 is energized toward the inner roller 34 by a cylinder 37.

When the metal ring 25 other than the outermost metal ring 25 is subjected to machining, one having a mesh-like recess on a circumferential surface thereof is used as the inner roller 34, and one having a flat circumferential surface is used as the outer roller 35. As a result, rolling is performed on the inner circumferential projection 25a by the inner roller 34 on the inner circumferential surface of the circulating metal ring 25. In addition, when the outermost metal ring 25 is subjected to machining, one having a mesh-like recess on a circumferential surface thereof is used as the inner roller 34, and one having a mesh-like recess on a circumferential surface thereof is used as the outer roller 35. As a result, rolling is performed on the inner circumferential projection 25a and the outer circumferential projection 25b respectively by the inner roller 34 and the outer roller 35 on the inner circumferential surface and the outer circumferential surface of the circulating metal ring 25.

Figure 4:
FIG. 4 illustrates a surface defect layer of the metal ring. (First Embodiment)

FIG. 4 is an enlarged cross-sectional view of a part of the metal ring 25 close to a surface (the inner circumferential surface and the outer circumferential surface) thereof. During manufacturing, it is inevitable that small cracks may occur in the surface of the metal ring 25, or small foreign matter may be mixed in the surface of the metal ring 25; in addition, an abnormally heat treated portion which underwent incomplete heat treatment may occur. In this way, defects of the surface of the metal ring 25 concentratedly occur within a region having a predetermined depth Hc, and the region having the depth Hc is referred to as a surface defect layer 25c. The thickness Hc of the surface defect layer 25c is, for example, about 1 μm.

During operation of the continuously variable transmission T, the inner circumferential surface and the outer circumferential surface of the metal ring 25 of the metal belt 15 wear due to friction. That is, the inner circumferential surface of the innermost metal ring 25 abuts against the saddle surface 24 (see FIG. 2) of the metal element 23 and wears, and the inner circumferential surface of the metal ring 25 other than the innermost metal ring 25 abuts against the outer circumferential surface of the metal ring 25 located inside the aforesaid metal ring 25 other than the innermost metal ring 25 and wears.

In addition, the outer circumferential surface of the metal ring 25 other than the outermost metal ring 25 abuts against the inner circumferential surface of the metal ring 25 located outside the aforesaid metal ring 25 other than the outermost metal ring 25 and wears. However, only the outer circumferential surface of the outermost metal ring 25 does not abut against anything and therefore does not wear.

The above-mentioned wear of the surface of the metal ring 25 proceeds relatively quickly immediately after use of a brand-new metal ring 25 is started, and almost no longer proceeds when a predetermined initial operating time has elapsed. A wear amount of the metal ring 25 at the time when the initial operating time has elapsed is referred to as initial wear amount.

Figure 5:
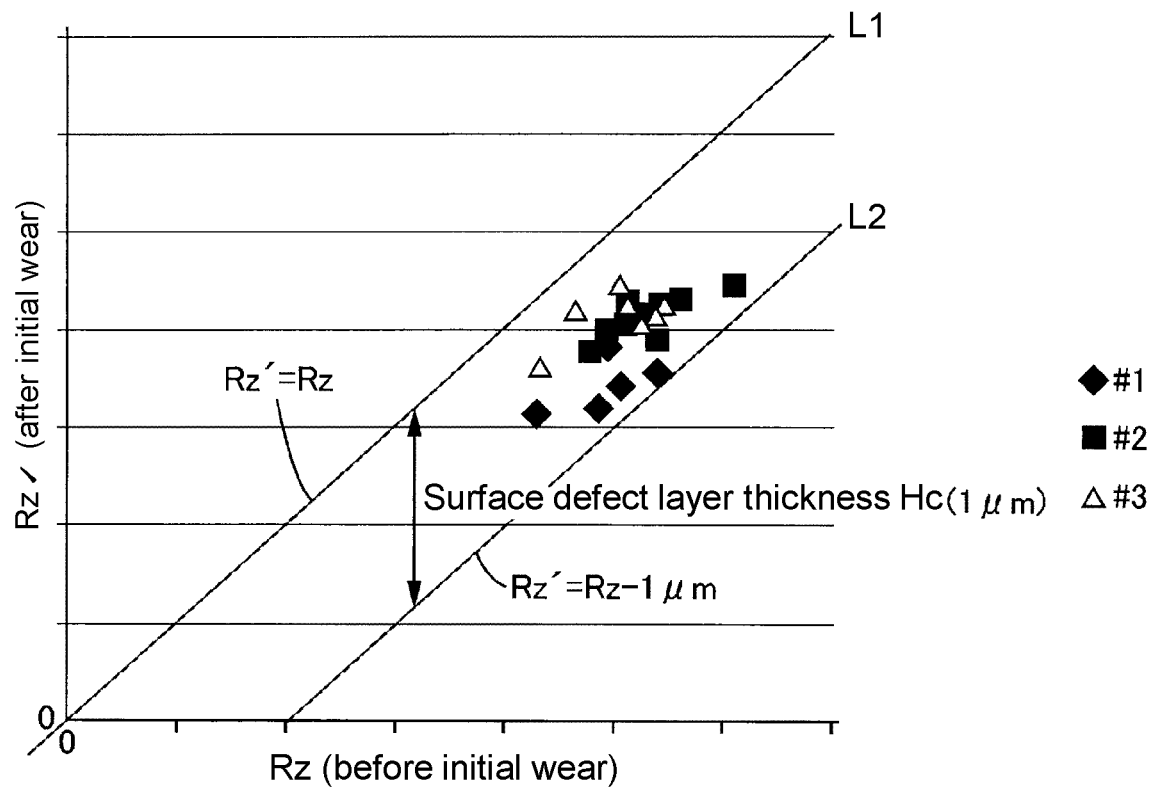
FIG. 5 is a graph illustrating a change in a maximum height of surface roughness of the projection of the metal ring before and after wear. (First Embodiment)

In the graph in FIG. 5, Rz and Rz' represent maximum heights of surface roughness of the metal ring 25, wherein the horizontal axis indicates the maximum height Rz of the projection of the metal ring 25 in the brand-new state, and the vertical axis indicates the maximum height Rz' of the projection of the metal ring 25 after initial wear. Line L1 is equivalent to a state in which Rz'=Rz, i.e., a case where the initial wear amount is zero; line L2 is equivalent to a case where the initial wear amount is 1 μm.

Three samples #1, #2 and #3 of the metal ring all fall within between lines L1 and L2. From this, it is clear that the magnitude of the initial wear amount is less than 1 μm, which is the thickness Hc of the surface defect layer 25c, and that it is difficult to remove the surface defect layer 25c by the initial wear.

Figure 6A:
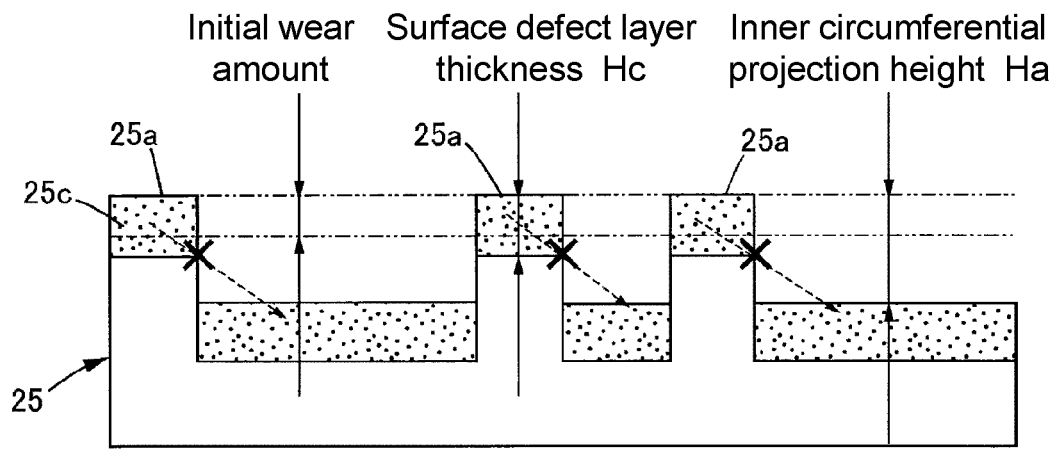
FIG. 6A and FIG. 6B are schematic views illustrating effects of the projection of the embodiment. (First Embodiment)
Figure 6B:
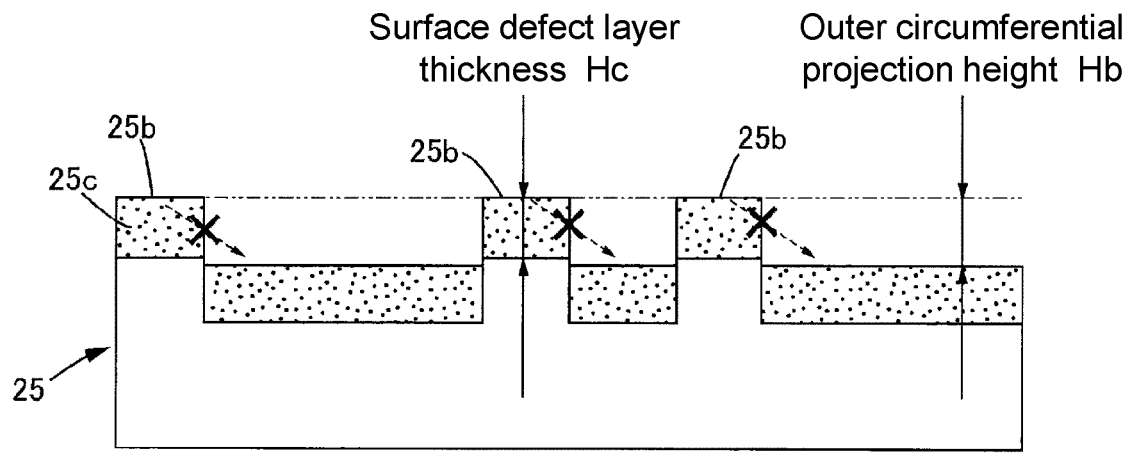

As shown in FIG. 6A, the surface defect layer 25c having the thickness Hc exists on the inner circumferential surface of all the metal rings 25, and the inner circumferential projection 25a having a projection height Ha projects from the inner circumferential surface of all the metal rings 25. The projection height Ha of the inner circumferential projection 25a is set greater than the thickness Hc of the surface defect layer 25c. In addition, as shown in FIG. 6B, the surface defect layer 25c having the thickness Hc exists on the outer circumferential surface of the outermost metal ring 25, and the outer circumferential projection 25b having a projection height Hb projects from the outer circumferential surface of the outermost metal ring 25. The projection height Hb of the outer circumferential projection 25b is set greater than the thickness Hc of the surface defect layer 25c, and is set smaller than the projection height Ha of the inner circumferential projection 25a.

Next, effects of the embodiments of the disclosure including the above configuration are explained.

Figure 7A:
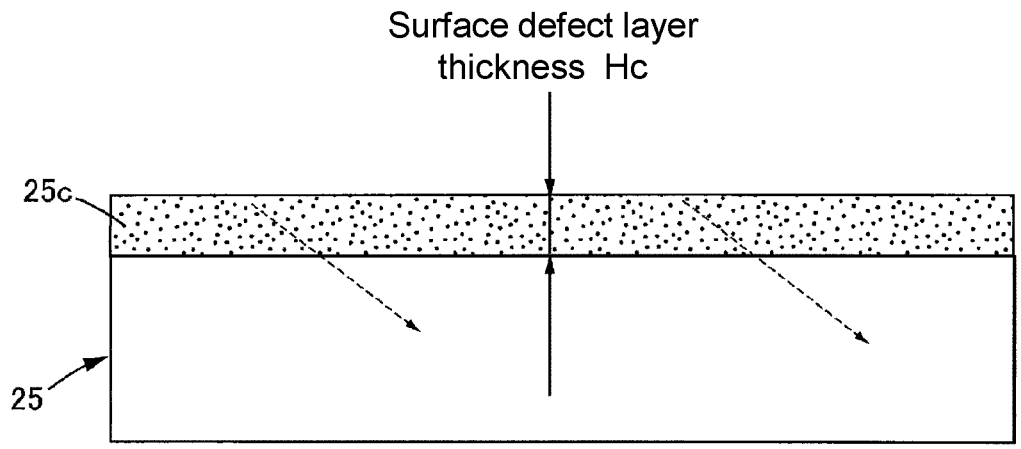
FIG. 7A and FIG. 7B are schematic views illustrating effects of the projection of a comparative example.
Figure 7B:
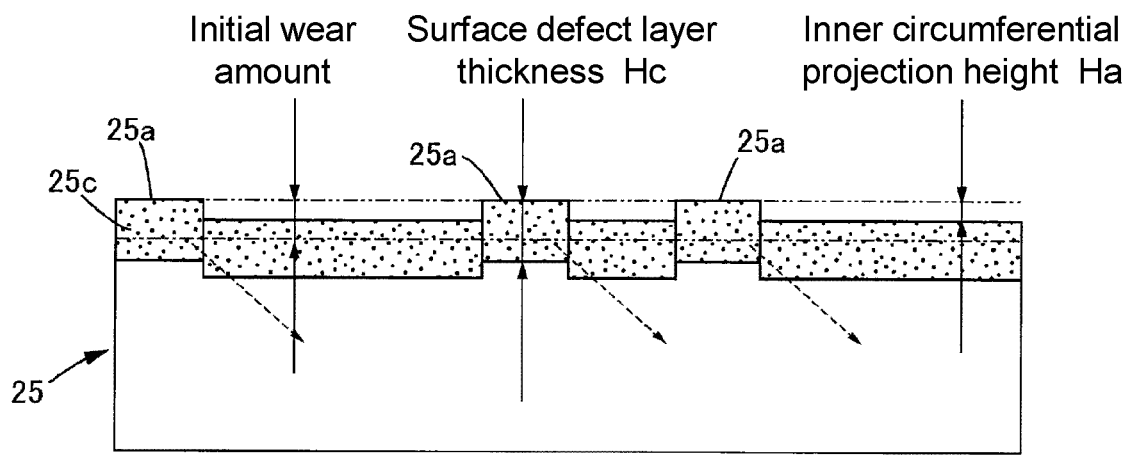

FIG. 7A illustrates a comparative example of the disclosure, showing a case where neither the inner circumferential surface nor the outer circumferential surface of the metal ring 25 include a projection. In this case, when cracks extend as shown by dashed arrows from the small cracks or the like existing in the surface defect layer 25c as starting points, there are fears that the cracks may extend without being arrested and cause breakage of the metal ring 25.

However, according to the present embodiment, as shown in FIG. 6A and FIG. 6B, when cracks extend as shown by dashed arrows from the small cracks or the like existing in the surface defect layer 25c as starting points, the cracks cannot extend any further at a stepped portion of a side surface of the inner circumferential projection 25a or the outer circumferential projection 25b (see x marks on the dashed lines), so the extension of the cracks is arrested, and breakage of the metal ring 25 is prevented before it occurs.

At this moment, even in the outer circumferential projection 25b that has a smaller projection height than the inner circumferential projection 25a, the projection height Hb of the outer circumferential projection 25b is set greater than the depth Hc of the surface defect layer 25c (see FIG. 6B). Thus, even if the small cracks or the like existing in a deepest part of the surface defect layer 25c are about to extend, the extension of the cracks is arrested by the stepped portion of the side surface of the outer circumferential projection 25b, and breakage of the metal ring 25 can be prevented.

The inner circumferential surface of the metal ring 25 abuts against the saddle surface 24 of the metal element 23 or the outer circumferential surface of another metal ring 25, and wears within the range of the initial wear amount. Therefore, as shown in the comparative example in FIG. 7B, if the projection height Ha of the inner circumferential projection 25a of the metal ring 25 is not sufficiently great, there are fears that the inner circumferential projection 25a itself may be removed due to wear, such that cracks may extend without being arrested, as shown by dashed arrows, from the small cracks or the like existing in the remaining surface defect layer 25c as starting points, and cause breakage of the metal ring 25.

However, according to the present embodiment, as shown in FIG. 6A, the projection height Ha of the inner circumferential projection 25a of the metal ring 25 is greater than the thickness Hc of the surface defect layer 25c of the metal ring 25, and the thickness Hc of the surface defect layer 25c is greater than the initial wear amount. Thus, even after the initial wear, the inner circumferential projection 25a will remain without being removed, the cracks extending from the small cracks or the like existing in the surface defect layer 25c as starting points are arrested by the stepped portion of the side surface of the inner circumferential projection 25a (see the x marks on the dashed lines), and breakage of the metal ring 25 can be prevented.

As described above, by providing the inner circumferential projection 25a or the outer circumferential projection 25b on the surface of the metal ring 25, durability of the metal ring 25 against breakage can be enhanced. However, when the projection height Ha of the inner circumferential projection 25a or the projection height Hb of the outer circumferential projection 25b becomes excessively great, since a problem arises in which flatness of the surface of the metal ring 25 is damaged and lubricity is reduced, the projection height Ha of the innercircumferential projection 25a or the projection height Hb of the outer circumferential projection 25b may be reduced to a necessary minimum.

In the present embodiment, the inner circumferential projection 25a of all the metal rings 25 abuts against the saddle surface 24 of the metal element 23 or the outer circumferential surface of another metal ring 25 and wears; in contrast, the outer circumferential projection 25b of the outermost metal ring 25 does not contact anything and does not wear. Accordingly, as shown in FIG. 6A and FIG. 6B, by setting the projection height Hb of the outer circumferential projection 25b of the metal ring 25 to be smaller than the projection height Ha of the inner circumferential projection 25a of the metal ring 25 by as much as the initial wear amount, the projection height HU of the outer circumferential projection 25b is reduced to the necessary minimum and lubricity is ensured, and load of the rolling apparatus that shapes the outer circumferential projection 25b can be reduced.

Second Embodiment

Figure 8:
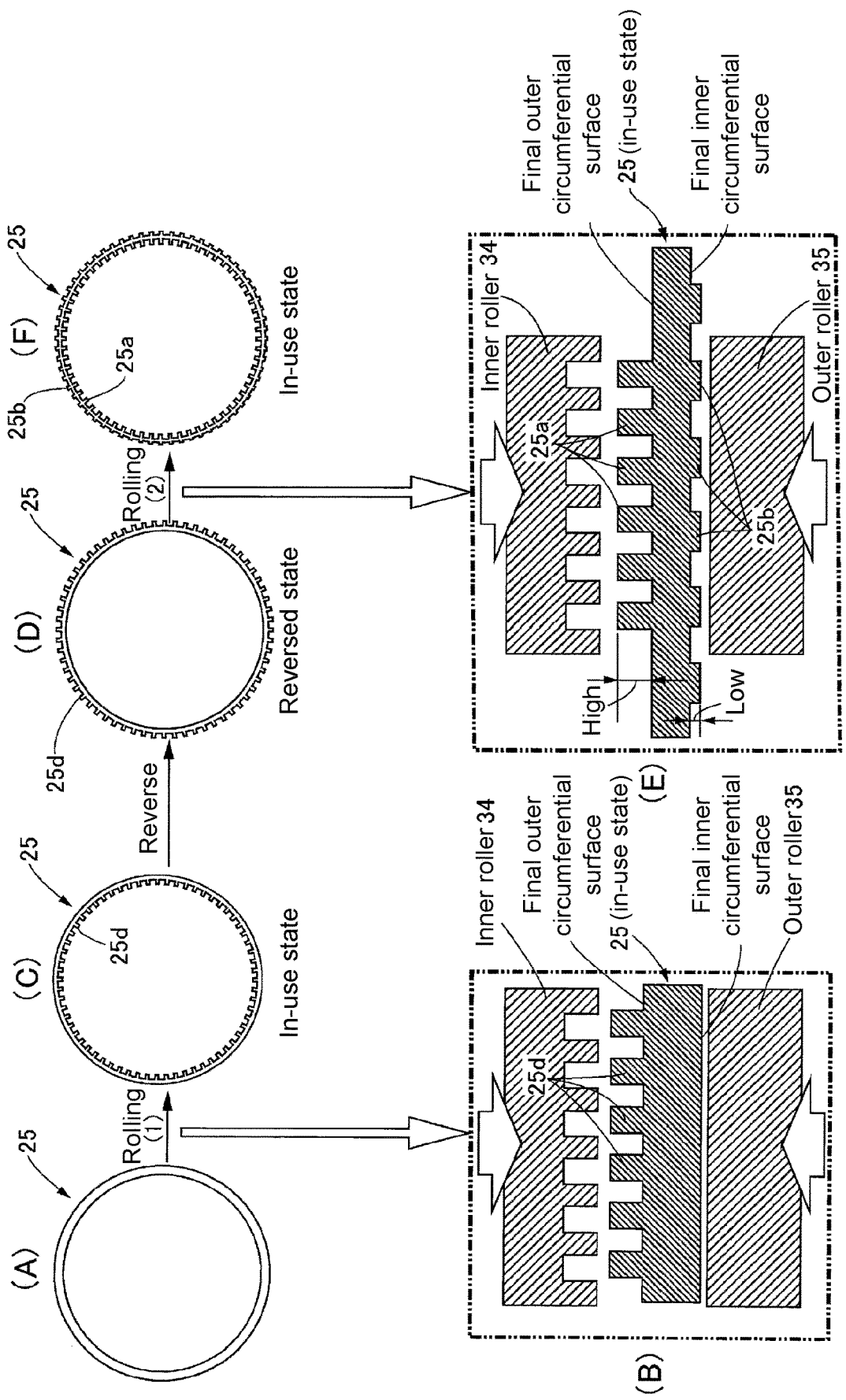
FIG. 8 with (A) to (F) therein illustrate a step of rolling the projection on the metal ring. (Second Embodiment)

Next, a second embodiment of the disclosure is explained based on FIG. 8 with (A) to (F) therein.

The second embodiment of the disclosure relates to a method of manufacturing a metal ring 25, wherein the metal ring 25 includes both the inner circumferential projection 25a and the outer circumferential projection 25b, and the projection height Hb of the outer circumferential projection 25b is smaller than the projection height Ha of the inner circumferential projection 25a.

A rolling apparatus used in the method of the present embodiment is the one that has been explained with reference to FIG. 3, wherein one having a mesh-like recess on a circumferential surface thereof is used as the inner roller 34, and one having a flat circumferential surface is used as the outer roller 35.

Firstly, as shown in (A) of FIG. 8, an unmachined metal ring 25 having flat outer circumferential surface and inner circumferential surface is mounted on the rolling apparatus. When rolling is performed thereon as shown in (B) of FIG. 8, the metal ring 25 having a provisional projection 25d on the inner circumferential surface (final outer circumferential surface) is obtained by means of the inner roller 34 (see (C) of FIG. 8). When the front and back of this metal ring 25 is reversed, as shown in (D) of FIG. 8, the metal ring 25 having a flat inner circumferential surface and having the provisional projection 25d on the outer circumferential surface is obtained.

When this metal ring 25 is again mounted on the rolling apparatus, and is subjected to rolling as shown in (E) of FIG. 8, at the same time as the inner circumferential projection 25a is formed on the flat final inner circumferential surface by means of the inner roller 34, the provisional projection 25d of the final outer circumferential surface that has been formed is crushed by the outer roller 35 and reduced in height, thereby forming the outer circumferential projection 25b, such that the metal ring 25 having the inner circumferential projection 25a with a great height on the inner circumferential surface and having the outer circumferential projection 25b with a small height on the outer circumferential surface is obtained (see (F) of FIG. 8).

In this way, according to the present embodiment, even if one having a mesh-like circumferential surface is used only as the inner roller 34, and one having a flat circumferential surface is used as the outer roller 35, both the inner circumferential projection 25a and the outer circumferential projection 25b can be formed on the metal ring 25.

The above has explained the embodiments of the disclosure. However, various design changes can be made within a scope not departing from the gist of the disclosure.

For example, although in the embodiments, the inner circumferential projection 25a is formed on the inner circumferential surface of all the metal rings 25, the inner circumferential projection 25a may be formed on the inner circumferential surface of at least one metal ring 25.

In addition, although in the embodiments, the outer circumferential projection 25b is formed only on the outer circumferential surface of the outermost metal ring 25, the outer circumferential projection 25b may be formed on the outer circumferential surface of the metal ring 25 other than the outermost metal ring 25. In this case, since the outer circumferential projection 25b on the outer circumferential surface of the metal ring 25 other than the outermost metal ring 25 abuts against the inner circumferential surface of another metal ring 25 and wears, the projection height Hb of the outer circumferential projection 25b may be set great so as to be equal to the projection height Ha of the inner circumferential projection 25a.

What is claimed is:

1. A metal belt for a continuously variable transmission, wherein the metal belt is wound around a drive pulley and a driven pulley, and comprises an endless metal ring assembly and a plurality of metal elements supported by the endless metal ring assembly, the endless metal ring assembly being formed by laminating a plurality of layers of endless metal rings, wherein
　　a mesh-like inner circumferential projection is formed on an inner circumferential surface of at least one metal ring among the plurality of layers of endless metal rings, a mesh-like outer circumferential projection is formed on an outer circumferential surface of the outermost metal ring among the plurality of layers of endless metal rings, and a projection height of the mesh-like outer circumferential projection is set smaller than a projection height of the mesh-like inner circumferential projection,
　　wherein the projection height of the mesh-like outer circumferential projection is greater than a thickness of a surface defect layer of the outermost metal ring
　　wherein parts of the surface defect layer exist on the mesh-like outer circumferential projection.

* * * * *